Nov. 11, 1924.
S. N. NORTH
PISTON AND PISTON RING
Filed May 6, 1921
1,514,783
2 Sheets-Sheet 1
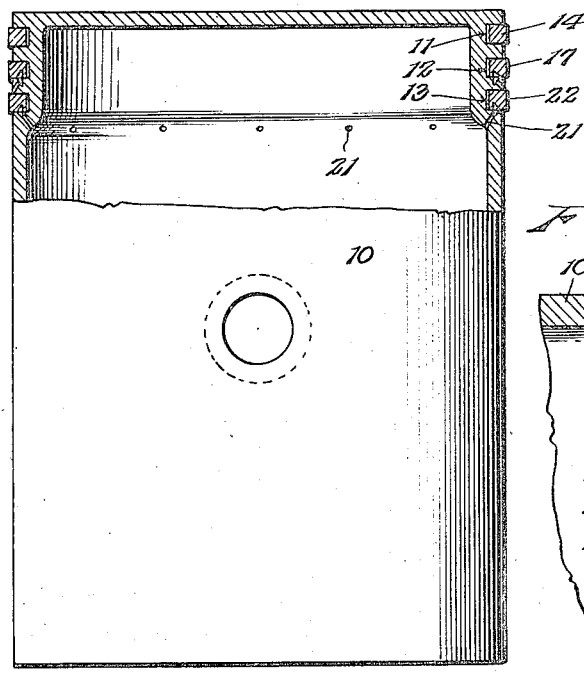
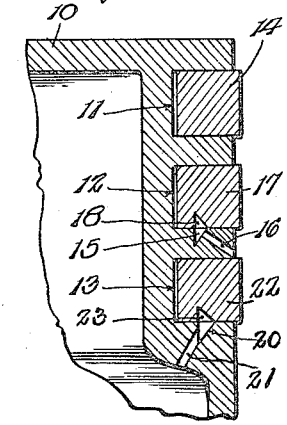
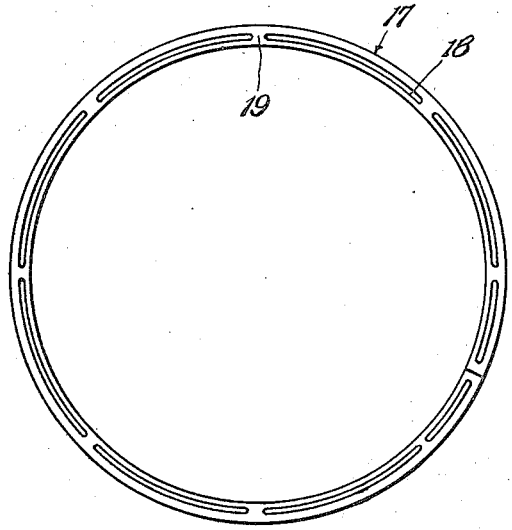
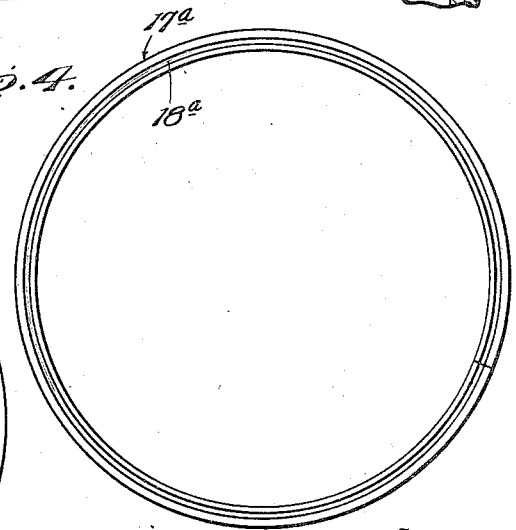
Inventor
S. N. North.
By Lacy & Lacy, Attorneys

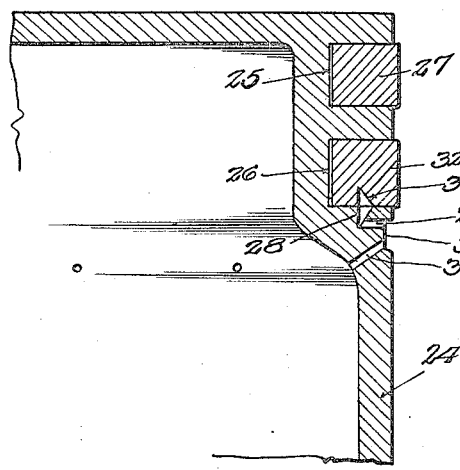
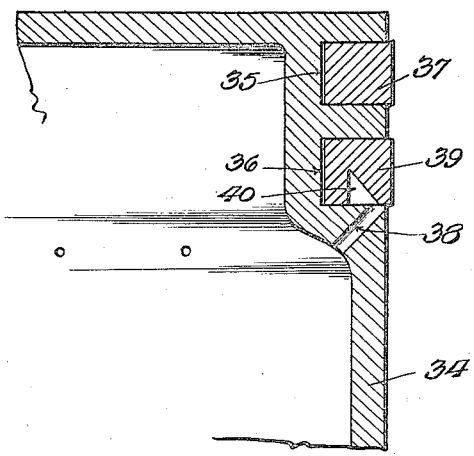
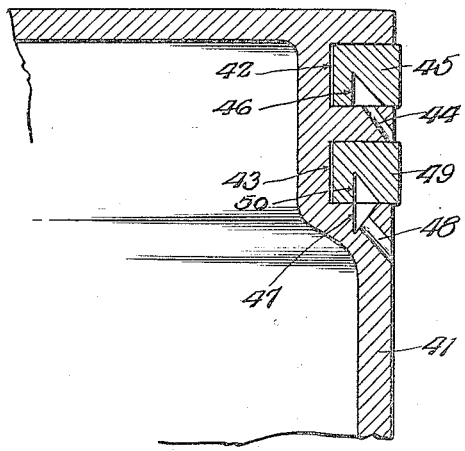
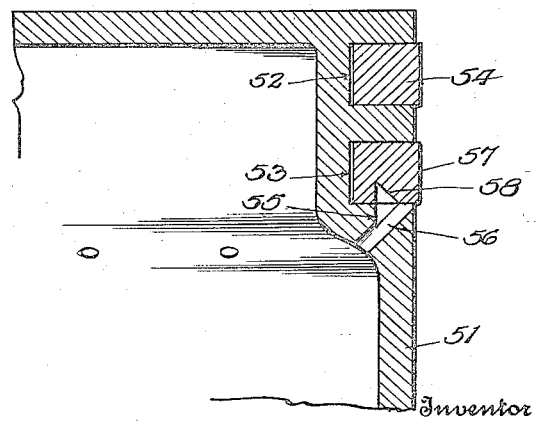

Patented Nov. 11, 1924.

1,514,783

UNITED STATES PATENT OFFICE.

SAMUEL N. NORTH, OF TOLEDO, OHIO.

PISTON AND PISTON RING.

Application filed May 6, 1921. Serial No. 467,359.

*To all whom it may concern:*

Be it known that I, SAMUEL N. NORTH, a citizen of the United States, residing at Toledo, in the county of Lucas and State of Ohio, have invented certain new and useful Improvements in Pistons and Piston Rings, of which the following is a specification.

This invention relates to an improved piston and piston ring for internal combustion engines and has as one of its principal objects to provide a construction wherein oil will be prevented from working behind the ring to rise thereover into the combustion chamber of an engine cylinder.

The invention has a further object to provide a construction wherein oil working into the piston ring groove will be collected beneath the ring to be drained out of the groove.

And the invention has as a still further object to provide a piston which may be employed in connection with any ordinary engine.

Other and incidental objects will appear hereinafter.

In the drawings:

Figure 1 is a fragmentary side elevation, partly in section, illustrating the piston and piston rings employed in the present invention, Figure 2 is an enlarged fragmentary section taken through the cylinder grooves and rings of the piston, Figure 3 is a bottom plan view of one of the rings, Figure 4 is a bottom plan view of a slightly modified ring, Figure 5 is a fragmentary section showing a slightly modified form of piston as well as one of the rings of the present invention, Figure 6 is a fragmentary section showing a further modification, Figure 7 is a fragmentary section showing another modification, and Figure 8 is a fragmentary section showing a still further modification.

In carrying the invention into effect, I employ a piston 10 having journal openings for receiving the usual wrist pin and formed in the wall of the piston near its upper end are vertically spaced ring grooves 11, 12 and 13 respectively, the wall of the piston being offset inwardly beneath the lowermost of said grooves. The groove 11 is designed to receive a piston ring 14 of any approved character. Formed in the bottom wall of the groove 12 is a substantially V-shaped annular oil groove 15, the inner wall of which lies parallel to the axis of the piston while the outer wall of said oil groove inclines upwardly and outwardly toward the periphery of the piston. Opening through the latter wall of the oil groove at its upper margin is a plurality of circumferentially spaced radial drain passages 16. These drain passages incline downwardly and at their outer ends open through the periphery of the dividing web between the grooves 12 and 13 at the lower margin of said web. Fitting in the groove 12 is a split resilient piston ring 17 in the lower face of which is formed an annular substantially V-shaped oil groove 18 lying near the inner side wall of said ring. However, flat, bearing surfaces are provided at the lower side of the ring upon opposite sides of said groove and, as will be observed, the groove 18 is disposed to normally register with the groove 15, the inner side wall of the groove 18 lying parallel to the axis of the ring while the outer side wall of such groove is inclined downwardly and outwardly toward the periphery of the ring. Intersecting the groove 18 at circumferentially spaced points about the ring are dividing webs 19 terminating flush with the lower face of the ring so as to seat flat against the bottom wall of the groove 12 in the piston. These webs are integral with the ring and will, of course, serve to reinforce the ring. However, if preferred, the ring may be constructed as shown in Figure 4, wherein the ring is indicated at 17ª while the groove is indicated at 18ª, the dividing webs being eliminated so that the groove is continuous. Upon the downward stroke of the piston, oil working into the groove 12 beneath the ring 17, will, due to the velocity of movement of the piston, be forced into the oil groove 18 of the ring and collected in said groove so that, when the piston moves upwardly the oil in said groove will be thrown downwardly into the oil groove 15 to be thence forced upwardly through the passages 16 to the wall of the cylinder in which the piston reciprocates. Accordingly, as will be seen, the oil will be prevented from working behind the ring to rise thereover, while, at the same time, oil scraped from the wall of the cylinder by the ring 17 will be redistributed to the cylinder wall for lubricating the piston. Formed in the bottom wall of the groove 13 is an annular oil groove 20 similar to the groove 15 and opening through the inner vertical wall of the oil groove at its lower margin, is a plurality of circumferentially spaced oil passages 21 leading to the interior of the piston. Fitting in the groove 13 is a split resilient piston ring 22 similar to the ring 17 and formed in the ring 22 is an annular oil groove 23 similar to the groove 18 and normally registering with the groove 20. Thus, oil working into the groove 13 beneath the ring 22 will be first caught and collected within the groove 23 and will thence be directed into the groove 20 to flow through the passages 21 into the piston.

In Figure 5, I have illustrated a modified form of piston 24. This piston is provided near its upper end with vertically spaced ring grooves 25 and 26 respectively. Fitting in the ring groove 25 is a piston ring 27 of approved character. The groove 26 is provided in its bottom wall with an annular V-shaped oil groove 28 corresponding to the groove 20 of the preferred construction and opening through the outer inclined wall of the oil groove at its lower margin is a plurality of circumferentially spaced horizontal oil passages 29. These oil passages are radially disposed and, at their outer ends open into an annular channel 30 formed in the periphery of the piston below the groove 26. Formed in the wall of the piston to open at their outer ends into said channel at its lower margin, is a plurality of circumferentially spaced oil passages 31. These oil passages are also radially disposed and inclined downwardly and inwardly to open into the piston. Fitting within the ring groove 26 is a split resilient piston ring 32 similar to the ring 17 and provided at its lower side with an annular V-shaped oil groove 33 corresponding to the groove 18 and normally registering with the groove 28. Accordingly, as will be seen, oil working into the groove 26 beneath the ring 32 will be caught and collected within the groove 33 to be thence thrown downwardly into the groove 28 when the oil will flow back out through the passages 29 into the channel 30. Any excess oil in this channel will then flow through the passages 31 into the piston.

In Figure 6 of the drawings, I have illustrated another modification wherein the piston 34 is provided near its upper end with ring grooves 35 and 36 respectively. Fitting in the groove 35 is a piston ring 37 of appropriate character. The groove 36 is formed at its lower side with a series of circumferentially spaced radial oil passages 38 opening at their outer ends through the bottom of the groove 36 at the periphery of the piston and inclining downwardly and inwardly to open at their inner ends into the piston. Fitting in the groove 36 is a split resilient piston ring 39 and formed in said ring at its lower side is a substantially V-shaped annular oil groove 40. This groove is similar to the groove 18 of the ring 17 but is somewhat deeper. As will be observed, the groove 40 communicates with the passages 38 while the outer ends of these passages are open below the ring. Accordingly, a portion of the oil scraped from the wall of the cylinder by the ring will flow directly through the passages into the piston. At the same time, any oil working into the groove 36 beneath the ring will be caught and collected within the groove 40 to be thence forced downwardly through the passages 38 into the piston.

In Figure 7 of the drawings, I have illustrated a further modification, wherein the piston 41 is formed near its upper end with annular ring grooves 42 and 43 respectively. Formed in the dividing web between these grooves is a series of circumferentially spaced radial oil passages 44 opening at their upper ends through the bottom wall of the groove 42 and inclining downwardly and outwardly to open at their lower ends through the periphery of said web at the groove 43. Fitting in the groove 42 is a split resilient piston ring 45 similar to the ring 39 of the prior modification and provided at its lower side with a substantially V-shaped oil groove 46 corresponding to the groove 40. The groove 46 is in communication with the passages 44 so that oil working into the groove 42 beneath the ring will be caught and collected within the groove 46 to be thence forced downwardly through the passages 44 to the wall of the piston in which the piston reciprocates. Formed in the bottom wall of the groove 43 is a substantially V-shaped annular oil groove 47 and opening through the outer side wall of said groove near the bottom thereof is a series of circumferentially spaced radial oil passages 48 inclining downwardly and outwardly to the periphery of the piston. Fitting in the groove 43 is a split resilient piston ring 49 similar to the ring 45 and provided at its lower side with a substantially V-shaped annular oil groove 50 corresponding to the groove 46. The groove 50 normally registers with the groove 47 so that oil working into the groove 43 beneath the ring will be caught and collected within the groove 50 to be thence forced downwardly into the groove 47 when the oil will then flow out through the passage 48 to the periphery of the piston.

In Figure 8 of the drawings, I have shown a still further modification wherein the piston 51 is provided near its upper end with annular ring grooves 52 and 53 respectively. Fitting in the groove 52 is a piston ring 54 of appropriate character. Formed in the bottom wall of the groove 53 is an annular substantially V-shaped oil groove 55 similar to the groove 47 of the prior modification and formed through the wall of the piston is a series of circumferentially spaced radial oil passages 56 intersecting the bottom wall of the oil groove. At their outer ends, the passages 56 open through the bottom wall of the groove 53 at the periphery of the piston while said passages incline downwardly and inwardly to open at their inner ends within the piston. Fitting in the groove 53 is a split resilient piston ring 57 in the lower side of which is formed an annular substantially V-shaped oil groove 58 normally registering with the groove 55. Since the outer ends of the passages 56 open below the ring, a portion of any oil collecting beneath the ring will flow directly through said passages into the piston. Oil working into the groove 53 beneath the ring will be collected within the groove 58 to be thence forced downwardly into the groove 55 when the oil will flow from this latter groove through the passages 56 into the piston.

Having thus described the invention, what is claimed as new is:

1. In combination, a piston having a ring groove and provided with a drain passage in communication with said groove, and a piston ring fitting in said groove and provided at its lower side with an oil groove communicating with said passage, the ring being formed at opposite sides of said oil groove with flat faces seating flat against the bottom wall of the ring groove of the piston.

2. In combination, a piston having a ring groove provided in its bottom wall with an oil groove, there being a drain passage leading from the oil groove to the periphery of the piston, and a piston ring fitting in the ring groove and provided at its lower side with an oil groove confronting the oil groove of the piston, the ring being formed at opposite sides of said oil groove with flat faces seating flat against the bottom wall of the ring groove of the piston.

3. In combination, a piston having spaced ring grooves one provided in its bottom wall with an oil groove, there being a drain passage leading from said oil groove to the periphery of the piston and another drain passage leading from another of said grooves to the periphery of the piston, and piston rings fitting in the ring grooves and provided at their lower sides with oil grooves, the oil groove of one of said rings confronting the first oil groove mentioned and the oil groove of the other of said rings communicating with said second mentioned passage.

4. A piston having spaced ring grooves one provided in its bottom wall with an oil groove, there being a drain passage leading from said oil groove to the periphery of the piston and the bottom wall of said ring groove being formed with flat faces at opposite sides of said oil groove.

In testimony whereof I affix my signature.

SAMUEL N. NORTH. [L. S.]